US012700345B2

(12) United States Patent
Lee

(10) Patent No.: US 12,700,345 B2
(45) Date of Patent: Aug. 4, 2026

(54) PIXELS

(71) Applicant: Samsung Display Co., Ltd., Yongin-si (KR)

(72) Inventor: Heechul Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/967,394

(22) Filed: Dec. 3, 2024

(65) Prior Publication Data

US 2025/0182683 A1 Jun. 5, 2025

(30) Foreign Application Priority Data

Dec. 4, 2023 (KR) ........................ 10-2023-0173440

(51) Int. Cl.
*G09G 3/3233* (2016.01)
*G09G 3/32* (2016.01)

(52) U.S. Cl.
CPC ............. *G09G 3/32* (2013.01); *G09G 3/3233* (2013.01); *G09G 2300/0842* (2013.01); *G09G 2310/08* (2013.01)

(58) Field of Classification Search
CPC ......... G09G 3/3233; G09G 2300/0842; G09G 2300/0819; G09G 2300/0861; G09G 3/3258; G09G 3/32; G09G 3/3208; G09G 3/3291; H10K 59/00–95
See application file for complete search history.

(56) References Cited

U.S. PATENT DOCUMENTS

| | | | | |
|---|---|---|---|---|
| 8,362,986 | B2 | 1/2013 | Ishiguro et al. | |
| 9,460,653 | B2 | 10/2016 | Han et al. | |
| 2007/0063932 | A1 | 3/2007 | Nathan et al. | |
| 2013/0106307 | A1 | 5/2013 | Tan et al. | |
| 2013/0194528 | A1 | 8/2013 | Wang et al. | |
| 2013/0321376 | A1* | 12/2013 | Kim ..................... | G09G 3/3233 345/212 |
| 2014/0198085 | A1* | 7/2014 | Park ..................... | G09G 3/3241 345/212 |
| 2016/0133190 | A1* | 5/2016 | Kim ..................... | G09G 3/2011 345/80 |
| 2017/0076646 | A1* | 3/2017 | Gu ..................... | H10K 59/1216 |

(Continued)

FOREIGN PATENT DOCUMENTS

| | | |
|---|---|---|
| JP | 2004-347993 A | 12/2004 |
| JP | 2010-276903 A | 12/2010 |

(Continued)

*Primary Examiner* — Sanjiv D. Patel
(74) *Attorney, Agent, or Firm* — Womble Bond Dickinson (US) LLP

(57) ABSTRACT

A pixel includes a first transistor configured to output a driving current corresponding to a magnitude of a data voltage, a second transistor connected to a data line, a third transistor connected between a second terminal of the first transistor and a gate of the first transistor, a fourth transistor connected between a first terminal of the first transistor and a driving voltage line, a fifth transistor connected to the second terminal of the first transistor, a sixth transistor connected between the first terminal of the first transistor and the second transistor, a light-emitting diode connected to the fifth transistor, and a storage capacitor connected between the gate of the first transistor and the driving voltage line.

20 Claims, 9 Drawing Sheets

(56) References Cited

U.S. PATENT DOCUMENTS

| | | | | |
|---|---|---|---|---|
| 2023/0048033 | A1 | 2/2023 | Uchino et al. | |
| 2023/0290311 | A1 | 9/2023 | Jeong et al. | |
| 2023/0368736 | A1* | 11/2023 | No | G09G 3/3233 |
| 2024/0420649 | A1* | 12/2024 | Liu | G09G 3/3233 |

FOREIGN PATENT DOCUMENTS

| | | | |
|---|---|---|---|
| KR | 10-2008-0103736 | A | 11/2008 |
| KR | 10-2013-0091136 | A | 8/2013 |
| KR | 10-2021-0086331 | A | 7/2021 |
| KR | 10-2486082 | B1 | 1/2023 |

* cited by examiner

PIXELS

CROSS-REFERENCE TO RELATED APPLICATION

The present application claims priority to and the benefit of Korean Patent Application No. 10-2023-0173440, filed on Dec. 4, 2023, in the Korean Intellectual Property Office, the entire disclosure of which is incorporated by reference herein.

BACKGROUND

1. Field

The present disclosure relates to a pixel designed to block leakage current of a transistor.

2. Description of the Related Art

A display apparatus includes pixels, and each pixel may include a capacitor, a light-emitting device, and a transistor that drives the light-emitting device.

SUMMARY

One or more embodiments of the present disclosure include a pixel that may improve the image quality of a display apparatus by preventing a data voltage written from a data voltage line from being lowered due to leakage current of a switching transistor.

One or more embodiments of the present disclosure include a pixel that may reduce micro-light emission in a non-emission period by preventing a driving voltage written from a driving voltage line from flowing into a light-emitting diode due to leakage current of a switching transistor.

Aspects and features of embodiments of the present disclosure are not limited to the ones mentioned above, and other aspects and features not mentioned may be clearly understood by those skilled in the art from the description below.

Additional aspects will be set forth in part in the description which follows and, in part, will be apparent from the description, or may be learned by practice of embodiments of the present disclosure.

According to one or more embodiments, a pixel includes a first transistor configured to output a driving current corresponding to a magnitude of a data voltage, a second transistor connected to a data line, a third transistor connected between a second terminal of the first transistor and a gate of the first transistor, a fourth transistor connected between a first terminal of the first transistor and a driving voltage line, a fifth transistor connected to the second terminal of the first transistor, a sixth transistor connected between the first terminal of the first transistor and the second transistor, a light-emitting diode connected to the fifth transistor, and a storage capacitor connected between the gate of the first transistor and the driving voltage line.

The pixel may further include a seventh transistor connected between the third transistor and an initialization voltage line.

The pixel may further include an eighth transistor connected between the fifth transistor and the initialization voltage line.

The pixel may operate in a non-emission period and an emission period during a frame period, wherein the non-emission period may include a first period in which the seventh transistor is turned on, the second transistor, the third transistor, the fourth transistor, the fifth transistor, the sixth transistor, and the eighth transistor are turned off, and an initialization voltage is applied to the gate of the first transistor from the initialization voltage line, and a second period in which the second transistor, the third transistor, the sixth transistor, and the eighth transistor are turned on, the fourth transistor, the fifth transistor, and the seventh transistor are turned off, a data signal is applied to the gate of the first transistor from the data line, and the initialization voltage is applied to a first terminal of the light-emitting diode from the initialization voltage line.

In the second period, a data voltage corresponding to the data signal applied to the first transistor and a threshold voltage of the first transistor may be stored in the storage capacitor.

The fourth transistor and the fifth transistor may be turned on during the emission period.

The non-emission period may further include, between the second period and the emission period, a delay period in which the second transistor, the third transistor, the fourth transistor, the fifth transistor, the sixth transistor, the seventh transistor, and the eighth transistor are turned off.

In the second period, the second transistor and the third transistor may be controlled by a first gate signal, the eighth transistor may be controlled by a second gate signal, and the sixth transistor may be controlled by a third gate signal.

A timing at which the third gate signal transitions from a gate-on voltage to a gate-off voltage and the sixth transistor is turned off may be ahead of a timing at which the first gate signal transitions from the gate-on voltage to the gate-off voltage and the second transistor is turned off.

During the delay period, a gate-source voltage of the turned-off sixth transistor may be greater than a gate-source voltage of the turned-off second transistor.

According to one or more embodiments, a pixel includes a first transistor configured to output a driving current corresponding to a magnitude of a data voltage, a second transistor connected between a first terminal of the first transistor and a data line, a third transistor connected between a second terminal of the first transistor and a gate of the first transistor, a fourth transistor connected between the first terminal of the first transistor and a driving voltage line, a fifth transistor connected to the second terminal of the first transistor, a sixth transistor connected between the fifth transistor and a light-emitting diode, the light-emitting diode connected to the sixth transistor, and a storage capacitor connected between the gate of the first transistor and the driving voltage line.

The pixel may further include a seventh transistor connected between the third transistor and an initialization voltage line.

The pixel may further include an eighth transistor connected between the sixth transistor and the initialization voltage line.

The pixel may operate in a non-emission period and an emission period during a frame period, wherein the non-emission period may include a first period in which the seventh transistor is turned on, the second transistor, the third transistor, the fourth transistor, the fifth transistor, the sixth transistor, and the eighth transistor are turned off, and an initialization voltage is applied to the gate of the first transistor from the initialization voltage line, and a second period in which the second transistor, the third transistor, and the eighth transistor are turned on, the fourth transistor, the fifth transistor, the sixth transistor, and the seventh transistor are turned off, a data signal is applied to the gate of the first transistor from the data line, and the initialization voltage is applied to a first terminal of the light-emitting diode from the initialization voltage line.

The fourth transistor, the fifth transistor, and the sixth transistor may be turned on in the emission period.

The non-emission period may further include, between the second period and the emission period, a delay period in which the second transistor, the third transistor, the fourth transistor, the fifth transistor, the sixth transistor, the seventh transistor, and the eighth transistor are turned off.

In the second period, the second transistor and the third transistor may be controlled by a fourth gate signal, and the eighth transistor may be controlled by a fifth gate signal.

In the emission period, the fourth transistor and the fifth transistor may be controlled by a sixth gate signal, and the sixth transistor may be controlled by a seventh gate signal.

A timing at which the seventh gate signal transitions from a gate-on voltage to a gate-off voltage and the sixth transistor is turned off may be ahead of a timing at which the sixth gate signal transitions from the gate-on voltage to the gate-off voltage and the fifth transistor is turned off.

During the non-emission period, the fifth transistor and the sixth transistor may be turned off, and a gate-source voltage of the turned-off sixth transistor may be greater than a gate-source voltage of the turned-off fifth transistor.

In addition, a computer program stored in a computer-readable recording medium for execution to implement the disclosure may be further provided.

In addition, a computer-readable recording medium recording a computer program for executing a method for implementing the disclosure may be further provided.

BRIEF DESCRIPTION OF THE DRAWINGS

The above and other aspects and features of embodiments of the present disclosure will be more apparent from the following description taken in conjunction with the accompanying drawings, in which.

DETAILED DESCRIPTION

Figure 1:
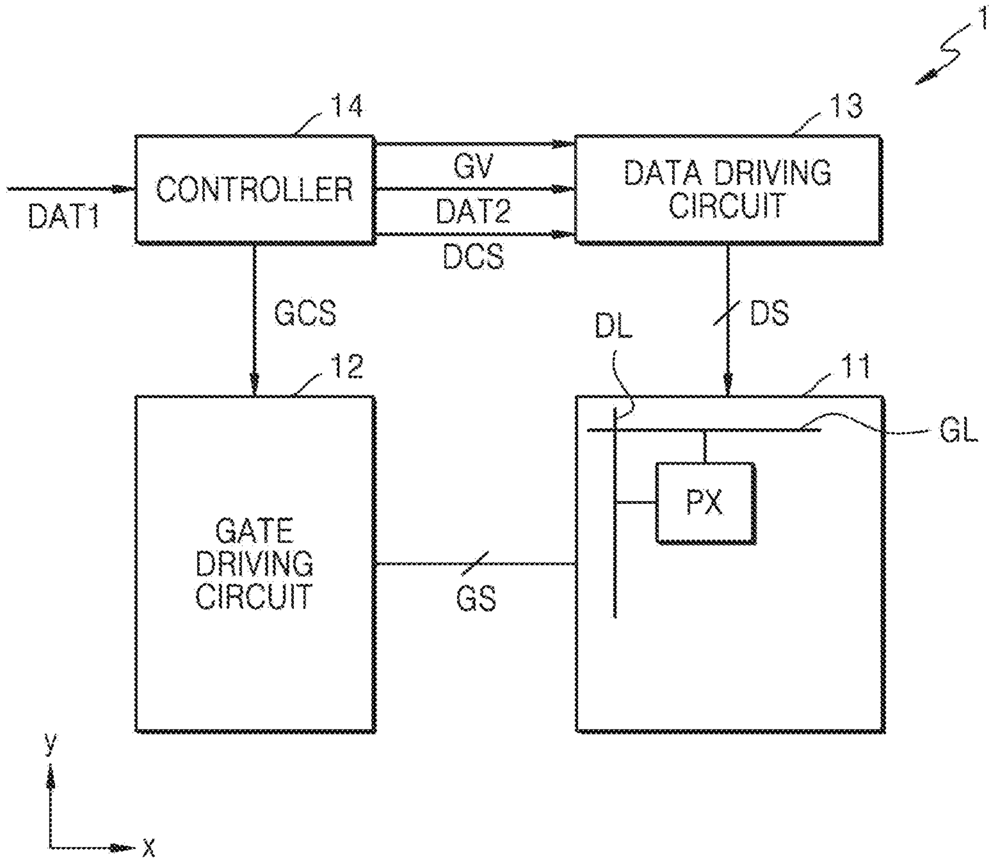
FIG. 1 is a diagram schematically illustrating a display apparatus according to one or more embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Throughout the present disclosure, the expression "at least one of a, b, or c" indicates only a, only b, only c, both a and b, both a and c, both b and c, all of a, b, and c, or variations thereof.

As the present disclosure allows for various changes and numerous embodiments, particular embodiments will be illustrated in the drawings and described in detail in the written description. The effects, aspects, and features of embodiments of the present disclosure, and ways to achieve them will become apparent by referring to embodiments that will be described later in detail with reference to the drawings. However, the present disclosure is not limited to the following embodiments but may be embodied in various forms.

It will be understood that although the terms "first," "second," etc. may be used herein to describe various elements, these elements should not be limited by these terms, and these terms are only used to distinguish one element from another element.

Singular expressions, unless defined otherwise in contexts, include plural expressions.

In the following embodiments, terms such as "include" or "have" mean that the features or elements described in the specification exist, and do not exclude in advance the possibility of adding one or more other features or elements.

Herein, "A and/or B" may indicate only A, only B, or both A and B. Also, "at least one of A and B" herein may indicate only A, only B, or both A and B.

In the following embodiments, when X and Y are connected to each other, this may include a case where X and Y are electrically connected to each other, a case where X and Y are functionally connected to each other, and a case where X and Y are directly connected to each other. Here, X and Y may be objects (e.g., apparatuses, elements, circuits, wires, electrodes, terminals, conductive films, layers, etc.). Thus, the connection relationship is not limited to a connection relationship (e.g., a predetermined connection relationship), for example, the connection relationship illustrated in the drawings or the detailed description, and may also include connection relationships other than those illustrated in the drawings or the detailed description.

When X and Y are electrically connected to each other, for example, at least one element that enables electrical connection between X and Y (e.g., a switch, a transistor, a capacitive element, an inductor, a resistive element, a diode, and/or the like) may be connected between X and Y.

In the following embodiments, "ON" used in connection with the state of an element may refer to an activated state of the element, and "OFF" may refer to a deactivated state of the element. "On," as used in connection with a signal received by an element, may refer to a signal that activates the element, and "off" may refer to a signal that deactivates the element. An element may be activated by a high-level voltage or a low-level voltage. For example, a P-channel transistor (P-type transistor) is activated by a low-level voltage, and an N-channel transistor (N-type transistor) is activated by a high-level voltage. Thus, it should be understood that the "on" voltages for the P-type transistor and the N-type transistor are opposite (low vs. high) voltage levels.

In the following embodiments, an x-direction, a y-direction, and a z-direction are not limited to directions along the three axes of the Cartesian coordinate system, and may be interpreted in a broad sense including these. For example, the x-direction, y-direction, and z-direction may be orthogonal to each other, but may also refer to different directions that are not orthogonal to each other.

Hereinafter, embodiments of the present disclosure will be described in detail with reference to the accompanying drawings, and in the description with reference to the drawings, like reference numerals refer to like elements and redundant descriptions thereof will be omitted.

FIG. 1 is a diagram schematically illustrating a display apparatus according to one or more embodiments.

Referring to FIG. 1, a display apparatus 1 may include a pixel unit 11, a gate driving circuit 12, a data driving circuit 13, and a controller 14.

A plurality of pixels PX and signal lines through which electrical signals may be applied to the plurality of pixels PX may be arranged in the pixel unit 11. The pixel unit 11 may be a display area where an image is displayed.

The plurality of pixels PX may be repeatedly arranged along a first direction (an x-direction, a row direction) and a second direction (a y-direction, a column direction). The plurality of pixels PX may be arranged in various forms such as a stripe arrangement, PENTILE® arrangement, or mosaic arrangement to realize an image. PENTILE® is a registered trademark of Samsung Display Co., Ltd., Republic of Korea. Each of the plurality of pixels PX may include a light-emitting diode as a display element, and the light-emitting diode may be connected to a pixel circuit. The pixel circuit may include a plurality of transistors and at least one capacitor. A pixel circuit according to one or more embodiments is described with respect to FIG. 2.

Signal lines through which electrical signals may be applied to the plurality of pixels PX may include a plurality of gate lines GL extending in the first direction (e.g., x-direction) and a plurality of data lines DL extending in the second direction (e.g., y-direction). The plurality of gate lines GL may be spaced from each other along the second direction (e.g., y-direction) and configured to transmit a gate signal GS to the pixels PX. The plurality of data lines DL may be spaced from each other in the first direction (e.g., x-direction) and configured to transmit a data signal DS to the pixels PX. Each of the plurality of pixels PX may be connected to at least one corresponding gate line from among the plurality of gate lines GL and a corresponding data line among the plurality of data lines DL. In FIG. 1, for convenience of illustration, one gate line connected to the pixel PX is illustrated. However, each pixel PX may be connected to a plurality of gate lines depending on the number of transistors constituting the pixel circuit.

The gate driving circuit 12 may be connected to the plurality of gate lines GL, generate the gate signal GS in response to a gate control signal GCS from the controller 14, and sequentially supply the gate signal GS to the gate lines GL. The gate line GL may be connected to a gate of a transistor included in the pixel PX. The gate signal GS may be a gate control signal that controls the turn-on and turn-off of a transistor having a gate connected to the gate line GL. The gate signal GS may be a square wave signal including an on voltage at which a transistor may be turned on and an off voltage at which a transistor may be turned off.

The data driving circuit 13 may be connected to the plurality of data lines DL and supply the data signal DS to the data lines DL in response to a control signal DCS from the controller 14. The data driving circuit 13 may receive gamma voltages GV respectively corresponding to gray levels and image data DAT2 from the controller 14, and generate the data signal DS corresponding to the gray levels.

The controller 14 may generate a gate control signal GCS and a data control signal DCS based on signals input from the outside. The controller 14 may supply the gate control signal GCS to the gate driving circuit 12 and the data control signal DCS to the data driving circuit 13.

The controller 14 may generate the image data DAT2 by converting input image data DAT1 input from an external source (e.g., a graphics processor). For example, the controller 14 may convert input image data DAT1 in RGB format into image data DAT2 in a format that matches the pixel arrangement of the pixel unit 11. The controller 14 may include a storage unit in which gamma voltages GV corresponding to gray levels and correction data are written.

In FIG. 1, the data driving circuit 13 and the controller 14 that are implemented independently of each other are illustrated, but the present disclosure is not limited thereto. For example, the data driving circuit 13 and the controller 14 may be implemented as a single integrated circuit (IC) (e.g., driving integrated circuit).

The display apparatus 1 according to one or more embodiments may be an organic light-emitting display apparatus (or an organic EL display apparatus), an inorganic light-emitting display apparatus (or an inorganic EL display apparatus), and/or a quantum dot light-emitting display apparatus.

The display apparatus 1 may be used as a display screen of not only a mobile phone, a smart phone, a tablet personal computer (PC), a mobile communication terminal, an electronic notebook, an e-book, a portable multimedia player (PMP), a navigation device, an ultra mobile personal computer (UMPC), but also that of various products such as televisions, laptops, monitors, billboards, and/or the Internet of Things (IOT) device. In addition, the display apparatus 1 according to one or more embodiments may be used in a wearable device such as a smart watch, a watch phone, a glasses-type display, and/or a head-mounted display (HMD). In addition, the display apparatus 1 according to one or more embodiments may be used as a panel of a vehicle, a center information display (CID) placed on the center fascia or a dashboard of a vehicle, a room mirror display which replaces a side mirror of a vehicle, or a display placed on the back of the front seat as entertainment for a passenger at the backseat of a vehicle.

Figure 2:
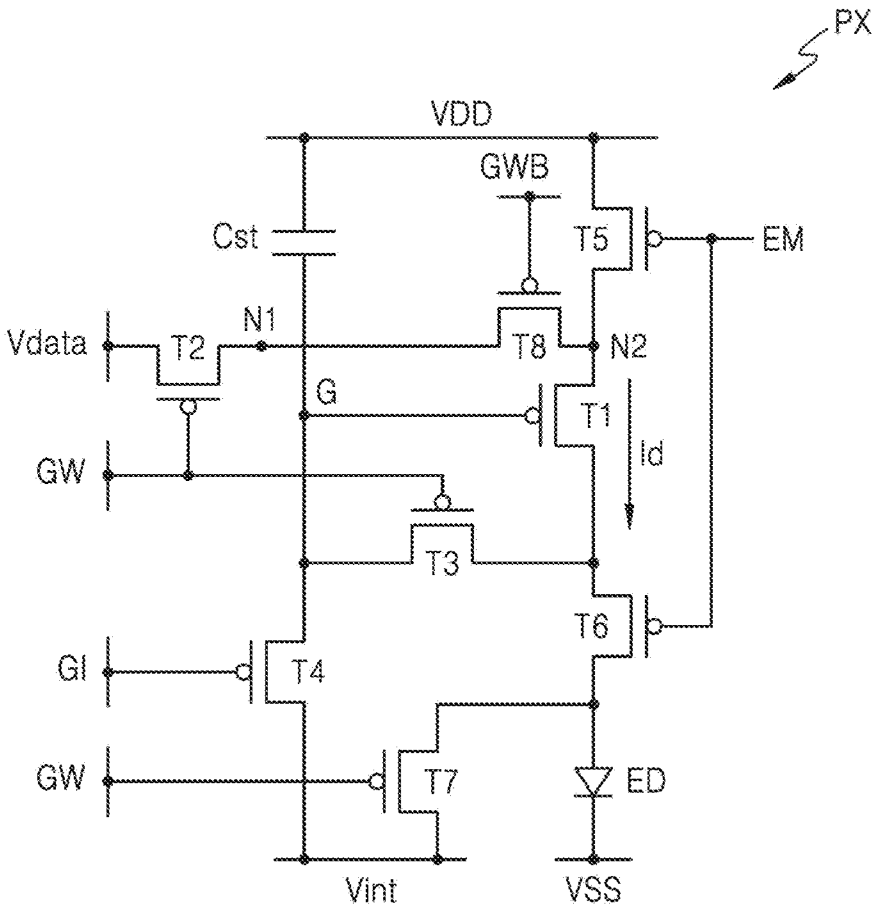
FIG. 2 is an equivalent circuit diagram of a pixel included in a display apparatus according to one or more embodiments.

FIG. 2 is an equivalent circuit diagram of a pixel PX included in the display apparatus 1 according to one or more embodiments.

Referring to FIG. 2, the pixel PX is a display element (i.e., a light-emitting device) and may include a light-emitting diode ED and a pixel circuit connected to the light-emitting diode ED. In one or more embodiments, the light-emitting diode ED may be an organic light-emitting diode (OLED). The pixel PX may emit, for example, red, green, blue, and/or white light through the light-emitting diode ED. In one or more embodiments, the pixel circuit may include first to eighth transistors T1 to T8 and a storage capacitor Cst.

The first transistor T1 may be a driving transistor configured to output a driving current Id corresponding to a data signal, and the second to eighth transistors T2 to T8 may be switching transistors configured to transfer signals. A first terminal (e.g., a first electrode) of each of the first to eighth transistors T1 to T8 may be a source or a drain, and a second terminal (e.g., a second electrode) of each of the first to eighth transistors T1 to T8 may be a terminal different from the first terminal. For example, when the first terminal is the source terminal, the second terminal may be the drain terminal.

In one or more embodiments, a node to which the second transistor T2 and the eighth transistor T8 are connected may be defined as a first node N1, a node to which the first transistor T1 and the fifth transistor T5 are connected may be defined as a second node N2, and a node to which the gate of the first transistor T1 and the third transistor T3 are connected may be defined as a gate node G.

In one or more embodiments, as shown in FIG. 2, a plurality of transistors, that is, the first to eighth transistors T1 to T8, included in the pixel circuit may be P-type metal oxide semiconductor field effect transistors (MOSFETs). In one or more embodiments, the plurality of transistors included in the pixel circuit may be N-type MOSFETs. In one or more embodiments, some of the plurality of transistors included in the pixel circuit may be N-type MOSFETs, and the others may be P-type MOSFETs.

In one or more embodiments, the plurality of transistors included in the pixel circuit may be P-type silicon thin-film transistors (si-TFTs). In one or more embodiments, the plurality of transistors included in the pixel circuit may be N-type oxide thin-film transistors (oxide-TFTs). In one or more embodiments, some of the plurality of transistors included in the pixel circuit may be N-type oxide-TFTs, and the others may be P-type si-TFTs.

The oxide-TFT may be a low temperature polycrystalline oxide (LTPO) TFT in which an active pattern (e.g., a semiconductor layer) includes oxide. However, this is an example, and N-type transistors are not limited thereto. For example, the active pattern (e.g., semiconductor layer) included in the N-type transistor may include an inorganic semiconductor (e.g., amorphous silicon or poly silicon) or an organic semiconductor. The si-TFT may be a low temperature poly-silicon (LTPS) TFT in which the active pattern (semiconductor layer) includes amorphous silicon, poly silicon, etc.

The pixel PX may be connected to a first gate line configured to transmit a first gate signal GW, a second gate line configured to transmit a second gate signal GI, a third gate line configured to transmit a third gate signal GWB, and a fourth gate line configured to transmit a fourth gate signal EM. In one or more embodiments, the fourth gate signal EM may be referred to as an emission control signal and the fourth gate line may be referred to as an emission control line. Additionally, the pixel PX may be connected to a driving voltage line configured to transmit a first driving voltage VDD, an initialization voltage line configured to transmit an initialization voltage Vint, and a data line configured to transmit a data voltage Vdata. The first gate signal GW, the second gate signal GI, the third gate signal GWB, and the fourth gate signal EM may be supplied from the gate driving circuit 12 of FIG. 1 to the pixel unit 11 of FIG. 1.

The voltage level of the first driving voltage VDD supplied through the driving voltage line may be higher than the voltage level of a second driving voltage VSS. The voltage level of the initialization voltage Vint may be lower than the voltage level of the first driving voltage VDD.

The first transistor T1 may be connected between the fifth transistor T5 and the sixth transistor T6. Additionally, the first transistor T1 may be connected between the third transistor T3 and the eighth transistor T8. The first transistor T1 may include a gate, a first terminal connected to the second node N2, and a second terminal. The first terminal of the first transistor T1 may be connected to the driving voltage line, through which the first driving voltage VDD is supplied, via the fifth transistor T5, and the second terminal of the first transistor T1 may be connected to a pixel electrode (e.g., an anode) of the light-emitting diode ED via the sixth transistor T6. The first transistor T1 may be configured to receive the data voltage Vdata through the data line, according to switching operations of the second transistor T2 and the eighth transistor T8, and control the amount of driving current Id flowing to the light-emitting diode ED.

The second transistor T2 may be connected between the eighth transistor T8 and a data line supplying the data voltage Vdata. The second transistor T2 may include a gate connected to the first gate line, a first terminal connected to the data line, and a second terminal connected to the first node N1. The second transistor T2 may be configured to be turned on in response to the first gate signal GW transmitted through the first gate line and electrically connect the data line to the first node N1, and transmit the data voltage Vdata, which corresponds to a data signal transmitted through the data line, to the first node N1 connected to the eighth transistor T8.

The third transistor T3 may be connected between the second terminal of the first transistor T1 and the gate of the first transistor T1. Additionally, the third transistor T3 may be connected between the fourth transistor T4 and the sixth transistor T6. The third transistor T3 may include a gate connected to the first gate line, a first terminal connected to the second terminal of the first transistor T1, and a second terminal connected to the gate node G and the storage capacitor Cst. In one or more embodiments, the third transistor T3 may be configured to be turned on in response to the first gate signal GW transmitted through the first gate line to connect the second terminal of the first transistor T1 to the gate of the first transistor T1.

The fourth transistor T4 may be connected between the gate of the first transistor T1 and the initialization voltage line. The fourth transistor T4 may include a gate connected to the second gate line, a first terminal connected to the gate node G, and a second terminal connected to the initialization voltage line. The fourth transistor T4 may be configured to be turned on in response to the second gate signal GI transmitted through the second gate line and supply the initialization voltage Vint transmitted through the initialization voltage line to the gate node G.

The fifth transistor T5 may be connected between the first terminal of the first transistor T1 and the driving voltage line through which the first driving voltage VDD is supplied. The fifth transistor T5 may include a gate connected to the fourth gate line, a first terminal connected to the driving voltage line, and a second terminal connected to the second node N2. The fifth transistor T5 may be configured to be turned on in response to the fourth gate signal EM transmitted through the fourth gate line and transfer the first driving voltage VDD to the first terminal of the first transistor T1.

The sixth transistor T6 may be connected between the second terminal of the first transistor T1 and the light-emitting diode ED. Additionally, the sixth transistor T6 may be connected between the third transistor T3 and the seventh transistor T7. The sixth transistor T6 may include a gate connected to the fourth gate line, a first terminal connected to the second terminal of the first transistor T1, and a second terminal connected to the pixel electrode (anode) of the light-emitting diode ED. The sixth transistor T6 may be configured to be turned on in response to the fourth gate signal EM transmitted through the fourth gate line and supply the driving current Id output by the first transistor T1 to the light-emitting diode ED.

The seventh transistor T7 may be connected between the light-emitting diode ED and the initialization voltage line. The seventh transistor T7 may include a gate connected to the first gate line, a first terminal connected to the pixel electrode (anode) of the light-emitting diode ED, and a second terminal connected to the initialization voltage line. The seventh transistor T7 may be configured to be turned on in response to the first gate signal GW transmitted through the first gate line and supply the initialization voltage Vint to the pixel electrode (anode) of the light-emitting diode ED. In one or more embodiments, the gate terminal of the seventh transistor T7 may be connected to the second gate line transmitting the second gate signal GI, but may have a different driving timing from that of the second gate line connected to the gate of the fourth transistor T4. For example, for a pixel PX in the n-th row, the gate of the fourth transistor T4 may be connected to the n-th second gate line, the n-th second gate signal may be received from the n-th second gate line, the gate of the seventh transistor T7 may be connected to the n+1-th second gate line, and the n+1-th second gate signal may be received from the n+1-th second gate line.

The eighth transistor T8 may be connected between the second transistor T2 and the first terminal of the first transistor T1. The eighth transistor T8 may include a gate connected to the third gate line, a first terminal connected to the first node N1, and a second terminal connected to the second node N2. The eighth transistor T8 may be configured to be turned on in response to the third gate signal GWB transmitted through the third gate line and supply the data voltage Vdata supplied through the second transistor T2 to the first transistor T1. In one or more embodiments, the gate of the eighth transistor T8 may be connected to the first gate line and receive the first gate signal GW from the first gate line.

In one or more embodiments, the data voltage Vdata transmitted through the data line may be supplied to the first node N1 as the second transistor T2 is turned on in response to the first gate signal GW. In this case, when the second transistor T2 is turned off, the voltage level of the first node N1 may be lower than that of the data voltage Vdata due to leakage current. When the eighth transistor T8 is connected between the second terminal of the second transistor T2 and the first terminal of the first transistor T1, the gate-source voltage ($V_{GS}$(T8)) of the eighth transistor T8 may be ($V_{GH}$−Vdata') (where $V_{GH}$ is the gate high voltage of the eighth transistor T8 and Vdata' is the voltage of the first node N1). When the eighth transistor T8 is not connected to the second transistor T2 and the second transistor T2 is directly connected to the first transistor T1, the gate-source voltage ($V_{GS}$(T2)) of the second transistor T2 may be ($V_{GH}$−Vdata) (where $V_{GH}$ is the gate high voltage of the second transistor T2 and Vdata is the data voltage). Because Vdata>Vdata', the gate-source voltage ($V_{GS}$(T8)) of the eighth transistor T8 when the eighth transistor T8 is connected to the second transistor T2 is greater than the gate-source voltage ($V_{GS}$(T2)) of the second transistor T2 when the second transistor T2 is directly connected to the first transistor T1, and thus, when the eighth transistor T8 is connected to the second transistor T2, turn-off efficiency may be higher than when the eighth transistor T8 is not connected to the second transistor T2. When the turn-off efficiency of a switching transistor is high, the leakage current blocking efficiency may be high.

The storage capacitor Cst may be connected between the driving voltage line and the gate of the first transistor T1. The first electrode of the storage capacitor Cst may be connected to the driving voltage line, and the second electrode of the storage capacitor Cst may be connected to the gate node G. The storage capacitor Cst may store the threshold voltage of the first transistor T1 and a voltage corresponding to the data signal.

The light-emitting diode ED may be connected to the sixth transistor T6. The light-emitting diode ED may include a pixel electrode (e.g., an anode) connected to the second terminal of the sixth transistor T6 and an opposite electrode (e.g., a cathode) facing the pixel electrode, and the second driving voltage VSS may be supplied to the opposite electrode. The opposite electrode may be a common electrode common to a plurality of pixels PX.

Figure 3:
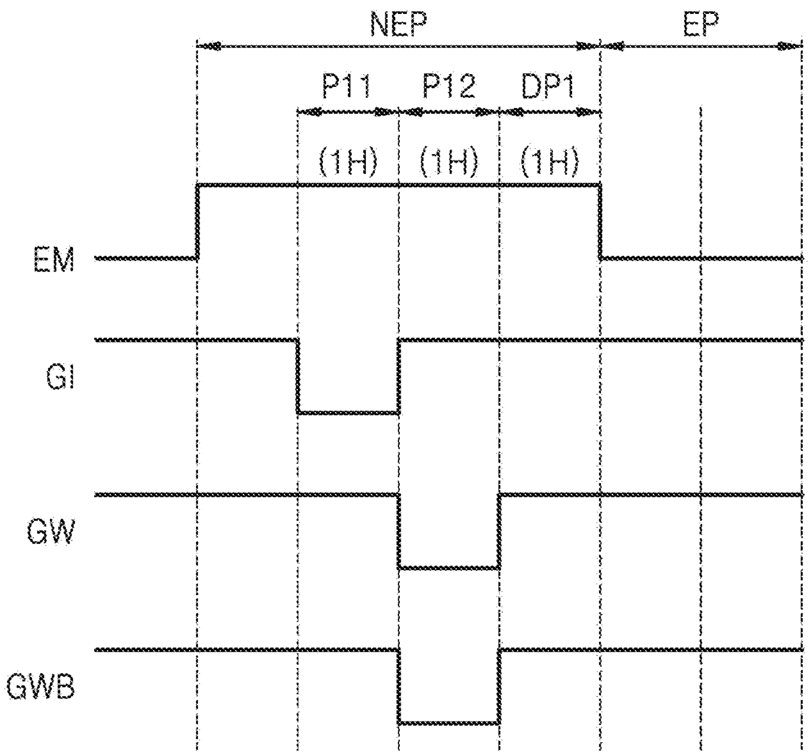
FIG. 3 is a timing diagram illustrating driving signals of a pixel circuit shown in FIG. 2, according to one or more embodiments.

FIG. 3 is a timing diagram illustrating driving signals of the pixel circuit shown in FIG. 2, according to one or more embodiments.

The pixel PX may display an image for each frame period. One frame period may include a non-emission period NEP in which the pixel PX does not emit light and an emission period EP in which the pixel PX emits light. The non-emission period NEP may include a first period P11, a second period P12, and a delay period DP1.

The first gate signal GW, the second gate signal GI, the third gate signal GWB, and the fourth gate signal EM may each have a high level voltage for some periods and a low level voltage for some other periods. In one or more embodiments, the high level voltage of each of the first gate signal GW, the second gate signal GI, the third gate signal GWB, and the fourth gate signal EM may be a gate-off voltage that turns off a transistor, and the low level voltage of each of the first gate signal GW, the second gate signal GI, the third gate signal GWB, and the fourth gate signal EM may be a gate-on voltage that turns on the transistor.

The first period P11 may be an initialization period that initializes the gate of the first transistor T1. The first period P11 may be approximately one horizontal period 1H.

In the first period P11, the first gate signal GW having the gate-off voltage may be supplied to the first gate line, the second gate signal GI having the gate-on voltage may be supplied to the second gate line, the third gate signal GWB having the gate-off voltage may be supplied to the third gate line, and the fourth gate signal EM having the gate-off voltage may be supplied to the fourth gate line. The initialization voltage Vint may be supplied through the initialization voltage line. When the initialization voltage Vint is supplied, the gate of the first transistor T1 may be initialized.

The fourth transistor T4 may be turned on in response to the second gate signal GI. The initialization voltage Vint may be transferred to the gate node G, that is, the gate of the first transistor T1, through the turned-on fourth transistor T4. In the first period P11, the voltage of the gate node G may be initialized to the initialization voltage Vint.

The second period P12 may be a writing and compensation period in which the data voltage Vdata is transferred to the gate of the first transistor T1 (e.g., because during the second period P12, the first transistor T1 is diode-connected) and the threshold voltage of the first transistor T1 is compensated. The second period P12 may be approximately one horizontal period 1H.

In the second period P12, the first gate signal GW having the gate-on voltage may be supplied to the first gate line, the second gate signal GI having the gate-off voltage may be supplied to the second gate line, the third gate signal GWB having the gate-on voltage may be supplied to the third gate line, and the fourth gate signal EM having the gate-off voltage may be supplied to the fourth gate line. The data voltage Vdata corresponding to the data signal may be supplied to the data line.

The second transistor T2, the third transistor T3, the seventh transistor T7, and the eighth transistor T8 may be turned on by the first gate signal GW and the third gate signal GWB. In this case, the fourth transistor T4, the fifth transistor T5, and the sixth transistor T6 may be turned off by the second gate signal GI and the fourth gate signal EM that have the gate-off voltage.

As the second transistor T2 is turned on by the first gate signal GW, the data voltage Vdata corresponding to the data signal transmitted through the data line may be transferred to the first node N1. As the eighth transistor T8 is turned on by the third gate signal GWB, the data voltage Vdata transferred to the first node N1 connected to the first terminal of the eighth transistor T8 may be supplied to the first terminal of the first transistor T1.

During the second period P12, as the second transistor T2 and the eighth transistor T8 are concurrently (e.g., simultaneously) turned on, the voltage levels of the first node N1 and the second node N2 may have the same voltage level as the data voltage Vdata. After the second period P12, when the second transistor T2 and the eighth transistor T8 are turned off by the gate-off voltages of the first gate signal GW and the third gate signal GWB, the voltage level of the first node N1 may ideally be the same voltage level as the voltage in the second period P12, but may be a voltage level (e.g., Vdata' as mentioned above) lower than that of the data voltage Vdata due to the leakage current of the second transistor T2. This will be described later.

As the third transistor T3 is turned on by the first gate signal GW, the drain of the first transistor T1 and the gate of the first transistor T1 may be coupled, and thus, the first transistor T1 may be in a diode-connected state, and the voltage of the second terminal of the first transistor T1, that is, a drain voltage (Vd), may be the gate voltage of the first transistor T1. A voltage obtained by compensating the data voltage Vdata, which is a voltage applied to the first terminal (i.e., the source) of the first transistor T1, by the threshold voltage Vth of the first transistor T1, that is, (Vdata+Vth) (where Vdata is the voltage of the second node N2 and Vth is the threshold voltage of the first transistor T1), may be applied to the gate of the first transistor T1, and a voltage corresponding to (Vdata+Vth) may be stored in the storage capacitor Cst.

As the seventh transistor T7 is turned on by the first gate signal GW, the initialization voltage Vint supplied to the initialization voltage line connected to the second terminal of the seventh transistor T7 may be supplied to the pixel electrode of the light-emitting diode ED connected to the first terminal of the seventh transistor T7, and the light-emitting diode ED may be initialized by the initialization voltage Vint.

The delay period DP1 may be a period in which the first gate signal GW, the second gate signal GI, the third gate signal GWB, and the fourth gate signal EM all have the gate-off voltage. By adding the delay period DP1, in which all of the first to fourth gate signals GW, GI, GWB, and EM have the gate-off voltage, after a data writing period, which is the second period P12, all transistors in the pixel circuit may be turned off, and by reducing interference from adjacent pixels PX, the data voltage Vdata corresponding to the data signal may be stabilized at a certain level. By adding the delay period DP1, the data voltage Vdata may be written more accurately to the first transistor T1, and thus, the pixel PX may emit light according to RGB colors by the data voltage Vdata with less loss in the emission period EP.

When the first gate signal GW has the gate-off voltage in the delay period DP1 and thus the second transistor T2 is turned off, the voltage level of the first node N1 may be a voltage level Vdata' lower than that of the data voltage Vdata when a leakage current is generated by the deteriorated second transistor T2. In this case, the source voltage of the eighth transistor T8 may be Vdata', which is the voltage of the first node N1. Accordingly, the gate-source voltage ($V_{GS}$(T8)) of the eighth transistor T8 when the eighth transistor T8 is turned off is ($V_{GH}$−Vdata') (where $V_{GH}$ is the gate high voltage of the eighth transistor T8 and Vdata' is the source voltage of the eighth transistor T8) and is greater than the gate-source voltage ($V_{GS}$(T2)) of the second transistor T2 when the second transistor T2 is turned off, and thus, the eighth transistor T8 may be surely turned off and leakage current of the eighth transistor T8 may be reduced (blocked). The pixel PX according to one or more embodiments includes the second transistor T2 and the eighth transistor T8 connected in series to the second transistor T2, between the data line and the first terminal of the first transistor T1, and thus, turn-off efficiency may be higher than that when the second transistor T2 is directly connected to the first transistor T1.

The emission period EP may be a period during which the light-emitting diode ED emits light. In the emission period EP, the fourth gate signal EM having the gate-on voltage may be supplied to the fourth gate line. The first gate signal GW having the gate-off voltage may be supplied to the first gate line, the second gate signal GI having the gate-off voltage may be supplied to the second gate line, and a third gate signal GWB having the gate-off voltage may be supplied to the third gate line. In this case, the fourth gate signal EM may be an emission control signal.

The second transistor T2, the third transistor T3, and the seventh transistor T7 may be turned off by the first gate signal GW, the fourth transistor T4 may be turned off by the second gate signal GI, and the eighth transistor T8 may be turned off by the third gate signal GWB. The fifth transistor T5 and the sixth transistor T6 may be turned on by the fourth gate signal EM.

As the fifth transistor T5 and the sixth transistor T6 are turned on, a current path through which the driving current Id flows from the driving voltage line to the light-emitting diode ED may be formed. The first driving voltage VDD may be supplied to the first terminal of the first transistor T1 by the turned-on fifth transistor T5, the turned-on first transistor T1 may output a driving current ($Id \propto (V_{GS}(T1)-Vth)^2$) having a size corresponding to a voltage ($V_{GS}$(T1)−Vth) obtained by subtracting the threshold voltage (Vth) of the first transistor T1 from the gate-source voltage ($V_{GS}$(T1)) of the first transistor T1, and the light-emitting diode ED may emit light having a brightness corresponding to the amount of the driving current Id, which is independent of the threshold voltage (Vth) of the first transistor T1.

Figure 4:
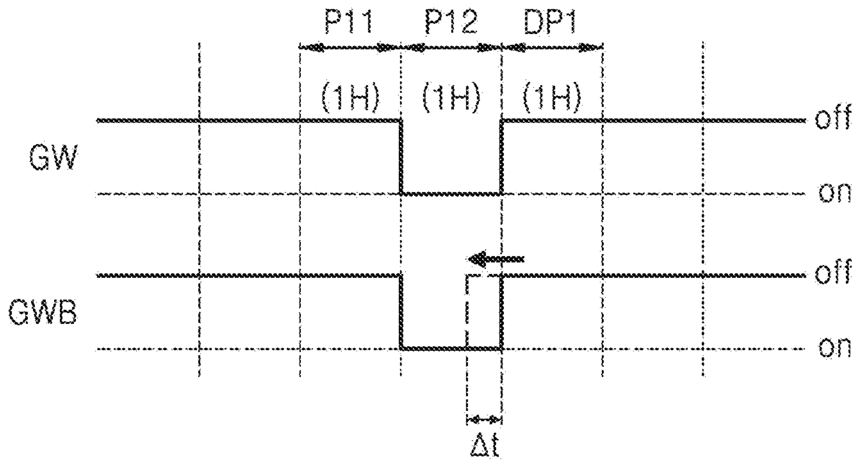
FIG. 4 is a timing diagram illustrating a method of preventing current leakage by adjusting the driving timing of an eighth transistor of a pixel circuit, according to one or more embodiments.

FIG. 4 is a timing diagram illustrating a method of preventing current leakage by adjusting the driving timing of the eighth transistor of the pixel circuit, according to one or more embodiments.

Referring to FIG. 4, the second transistor T2, the third transistor T3, and the seventh transistor T7 may be turned on by the gate-on voltage of the first gate signal GW in the second period P12 of the non-emission period NEP. Additionally, the eighth transistor T8 may be turned on by the gate-on voltage of the third gate signal GWB. The second period P12 may be approximately one horizontal period 1H.

In one or more embodiments, the first gate signal GW and the third gate signal GWB may be gate signals transmitted along different gate lines. For example, the first gate signal GW may be a gate signal transmitted by the first gate line, and the third gate signal GWB may be a gate signal transmitted by the third gate line. The first gate signal GW transmitted by the first gate line and the third gate signal GWB transmitted by the third gate line may be supplied as a gate-on voltage and a gate-off voltage at different timings.

Referring to FIG. 4, the timing at which the third gate signal GWB changes from the gate-on voltage to the gate-off voltage may be ahead, by Δt, of the timing at which the first gate signal GW changes from the gate-on voltage to the gate-off-voltage. For example, while the first gate signal GW maintains the gate-on voltage for one horizontal period 1H, the third gate signal GWB may maintain the gate-on voltage for a horizontal period of (1−Δt)H, which is shorter than one horizontal period 1H by Δt, and transition to the gate-off voltage. As the third gate signal GWB transitions to the gate-off voltage before the first gate signal GW, the eighth transistor T8 may be turned off before the second transistor T2. As the eighth transistor T8 is turned off, the leakage current of the second transistor T2 may not immediately flow to the first transistor T1, and the eighth transistor T8 may block the leakage current generated in the second transistor T2 from flowing into the first transistor T1. The pixel PX according to one or more embodiments includes the second transistor T2 and the eighth transistor T8 connected in series to the second transistor T2, between the data line and the first terminal of the first transistor T1, and thus, turn-off efficiency may be higher than that when the second transistor T2 is directly connected to the first transistor T1.

Figure 5:
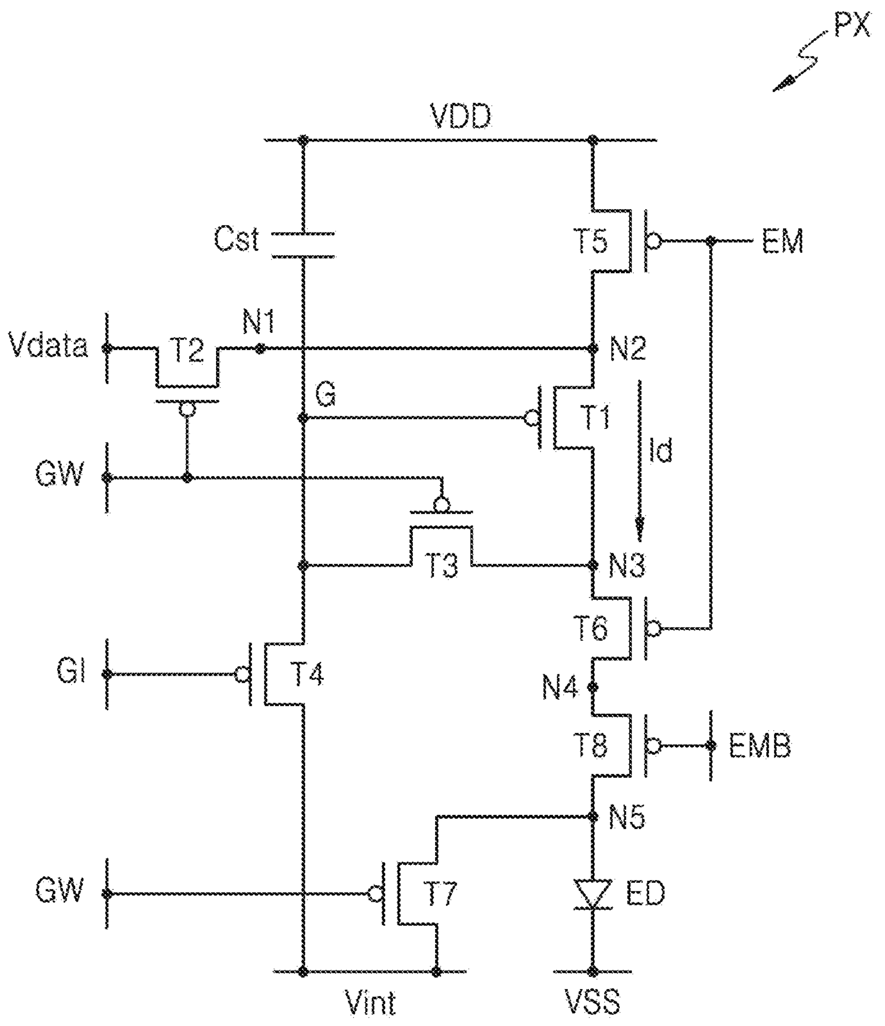
FIG. 5 is an equivalent circuit diagram of a pixel included in a display apparatus according to one or more embodiments.

FIG. 5 is an equivalent circuit diagram of a pixel PX included in a display apparatus according to one or more embodiments.

Referring to FIG. 5, the pixel PX is a display element (i.e., a light-emitting device) and may include a light-emitting diode ED and a pixel circuit connected to the light-emitting diode ED. In one or more embodiments, the light-emitting diode ED may be an OLED. The pixel PX may emit, for example, red, green, blue, and/or white light through the light-emitting diode ED. In one or more embodiments, the pixel circuit may include first to eighth transistors T1 to T8 and a storage capacitor Cst.

The first transistor T1 may be a driving transistor configured to output a driving current Id corresponding to a data signal, and the second to eighth transistors T2 to T8 may be switching transistors configured to transfer signals. A first terminal (e.g., a first electrode) of each of the first to eighth transistors T1 to T8 may be a source or a drain terminal, and a second terminal (e.g., a second electrode) of each of the first to eighth transistors T1 to T8 may be a terminal different from the first terminal. For example, when the first terminal is the source, the second terminal may be the drain.

In one or more embodiments, a node to which the first transistor T1 and the sixth transistor T6 are connected may be defined as a third node N3, a node to which the sixth transistor T6 and the eighth transistor T8 are connected may be defined as a fourth node N4, a node to which the eighth transistor T8 and the light-emitting diode ED are connected may be defined as a fifth node N5, and a node to which the gate of the first transistor T1 and the third transistor T3 are connected may be defined as a gate node G.

The location of the eighth transistor T8 in the pixel PX shown in FIG. 5 is different from the location of the eighth transistor T8 in the pixel PX shown in FIG. 2. Hereinafter, a detailed description of the same configuration as the pixel PX of FIG. 2 will be omitted, and the description will focus on the differences.

In FIG. 5, the pixel PX may be connected to a first gate line configured to transmit a first gate signal GW, a second gate line configured to transmit a second gate signal GI, a fourth gate line configured to transmit a fourth gate signal EM, and a fifth gate line configured to transmit a fifth gate signal EMB. In one or more embodiments, the fourth gate signal EM and the fifth gate signal EMB may be referred to as emission control signals, and the fourth and fifth gate lines may be referred to as emission control lines. Additionally, the pixel PX may be connected to a driving voltage line configured to transmit a first driving voltage VDD, an initialization voltage line configured to transmit an initialization voltage Vint, and a data line configured to transmit a data voltage Vdata. The first gate signal GW, the second gate signal GI, the third gate signal GWB, the fourth gate signal EM, and the fifth gate signal EMB may be supplied from the gate driving circuit 12 in FIG. 1 to the pixel unit 11 in FIG. 1.

The first transistor T1 may be connected between the fifth transistor T5 and the sixth transistor T6. Additionally, the first transistor T1 may be connected between the second transistor T2 and the third transistor T3. The first transistor T1 may include a gate, a first terminal, and a second terminal connected to the third node N3. The first terminal of the first transistor T1 may be connected to the driving voltage line, through which the first driving voltage VDD is supplied, via the fifth transistor T5, and the second terminal of the first transistor T1 may be connected to a pixel electrode (e.g., an anode) of the light-emitting diode ED via the sixth transistor T6 and the eighth transistor T8. The first transistor T1 may be configured to receive the data voltage Vdata through the data line according to a switching operation of the second transistor T2 and control the amount of driving current Id flowing to the light-emitting diode ED.

The second transistor T2 may be connected between the first transistor T1 and a data line supplying the data voltage Vdata. The second transistor T2 may include a gate connected to the first gate line, a first terminal connected to the data line, and a second terminal connected to the first transistor T1. The second transistor T2 may be configured to be turned on in response to the first gate signal GW transmitted through the first gate line and electrically connect the data line to the first terminal of the first transistor T1, and transmit the data voltage Vdata, which corresponds to a data signal transmitted through the data line, to the first transistor T1.

The third transistor T3 may be connected between the second terminal of the first transistor T1 and the gate of the first transistor T1. Additionally, the third transistor T3 may be connected between the fourth transistor T4 and the sixth transistor T6. The third transistor T3 may include a gate connected to the first gate line, a first terminal connected to the second terminal of the first transistor T1, and a second terminal connected to the gate node G and the storage capacitor Cst. In one or more embodiments, the third transistor T3 may be configured to be turned on in response to the first gate signal GW transmitted through the first gate line to connect the second terminal of the first transistor T1 to the gate of the first transistor T1 (e.g., which results in diode-connection of the first transistor T1).

The fourth transistor T4 may be connected between the gate of the first transistor T1 and the initialization voltage line. The fourth transistor T4 may include a gate connected to the second gate line, a first terminal connected to the gate node G, and a second terminal connected to the initialization voltage line. The fourth transistor T4 may be configured to be turned on in response to the second gate signal GI transmitted through the second gate line and supply the initialization voltage Vint transmitted through the initialization voltage line to the gate node G.

The fifth transistor T5 may be connected between the first terminal of the first transistor T1 and the driving voltage line through which the first driving voltage VDD is supplied. The fifth transistor T5 may include a gate connected to the fourth gate line, a first terminal connected to the driving voltage line, and a second terminal connected to the first transistor T1. The fifth transistor T5 may be configured to be turned on in response to the fourth gate signal EM transmitted through the fourth gate line and transfer the first driving voltage VDD to the first terminal of the first transistor T1.

The sixth transistor T6 may be connected between the second terminal of the first transistor T1 and the eighth transistor T8. Additionally, the sixth transistor T6 may be connected between the third transistor T3 and the eighth transistor T8. The sixth transistor T6 may include a gate connected to the fourth gate line, a first terminal connected to the second terminal of the first transistor T1, and a second terminal connected to the fourth node N4. The sixth transistor T6 may be configured to be turned on in response to the fourth gate signal EM transmitted through the fourth gate line and supply the driving current Id output by the first transistor T1 to the light-emitting diode ED via the eighth transistor T8.

The seventh transistor T7 may be connected between the light-emitting diode ED and the initialization voltage line. The seventh transistor T7 may include a gate connected to the first gate line, a first terminal connected to the fifth node N5, and a second terminal connected to the initialization voltage line. The seventh transistor T7 may be configured to be turned on in response to the first gate signal GW transmitted through the first gate line and supply the initialization voltage Vint to the pixel electrode (anode) of the light-emitting diode ED. In another embodiment, the gate of the seventh transistor T7 may be connected to the second gate line transmitting the second gate signal GI, but may have different driving timing from that of the second gate line connected to the gate of the fourth transistor T4. For example, for a pixel PX in the n-th row, the gate of the fourth transistor T4 may be connected to the n-th second gate line, the n-th second gate signal may be received from the n-th second gate line, the gate of the seventh transistor T7 may be connected to the n+1-th second gate line, and the n+1-th second gate signal may be received from the n+1-th second gate line.

The eighth transistor T8 may be connected between the sixth transistor T6 and the light-emitting diode ED. The eighth transistor T8 may include a gate connected to the fifth gate line, a first terminal connected to the fourth node N4, and a second terminal connected to the fifth node N5 and the pixel electrode of the light-emitting diode ED. The eighth transistor T8 may be configured to be turned on in response to the fifth gate signal EMB transmitted through the fifth gate line and supply the driving current Id supplied through the sixth transistor T6 to the light-emitting diode ED. In one or more embodiments, the gate of the eighth transistor T8 may be connected to the fourth gate line and receive the fourth gate signal EM from the fourth gate line.

In one or more embodiments, when the fifth transistor T5 and the sixth transistor T6 are turned off by the fourth gate signal EM, a voltage $V_4$ of the fourth node N4 may be lower than a voltage $V_2$ of the second node N2 and/or a voltage $V_3$ of the third node N3 due to the leakage current of the fifth transistor T5 and the sixth transistor T6. When the eighth transistor T8 is connected to the second terminal of the sixth transistor T6, the gate-source voltage ($V_{GS}$(T8)) of the eighth transistor T8 may be ($V_{GH}$–$V_4$) (where $V_{GH}$ is the gate high voltage of the eighth transistor T8 and $V_4$ is the source voltage of the eighth transistor T8). When the eighth transistor T8 is not connected to the sixth transistor T6 and the sixth transistor T6 is directly connected to the light-emitting diode ED, the gate-source voltage ($V_{GS}$(T6)) of the sixth transistor T6 may be ($V_{GH}$–$V_3$) (where $V_{GH}$ is the gate high voltage of the sixth transistor T6 and $V_3$ is the source voltage of the sixth transistor T6). Because $V_3$>$V_4$, the gate-source voltage ($V_{GS}$(T8)) of the eighth transistor T8 when the eighth transistor T8 is connected to the sixth transistor T6 is greater than the gate-source voltage ($V_{GS}$(T6)) of the sixth transistor T6 when the sixth transistor T6 is directly connected to the light-emitting diode ED, and thus, when the eighth transistor T8 is connected to the sixth transistor T6, turn-off efficiency may be higher than that when the eighth transistor T8 is not connected to the sixth transistor T6. When the turn-off efficiency of a switching transistor is high, the leakage current blocking efficiency may be high.

The storage capacitor Cst may be connected between the driving voltage line and the gate of the first transistor T1. The first electrode of the storage capacitor Cst may be connected to the driving voltage line, and the second electrode of the storage capacitor Cst may be connected to the gate node G. The storage capacitor Cst may store the threshold voltage of the first transistor T1 and a voltage corresponding to the data signal.

The light-emitting diode ED may be connected to the eighth transistor T8. The light-emitting diode ED may include a pixel electrode (e.g., an anode) connected to the second terminal of the eighth transistor T8 and an opposite electrode (e.g., a cathode) facing the pixel electrode, and the second driving voltage VSS may be supplied to the opposite electrode. The opposite electrode may be a common electrode common to a plurality of pixels PX.

Figure 6:
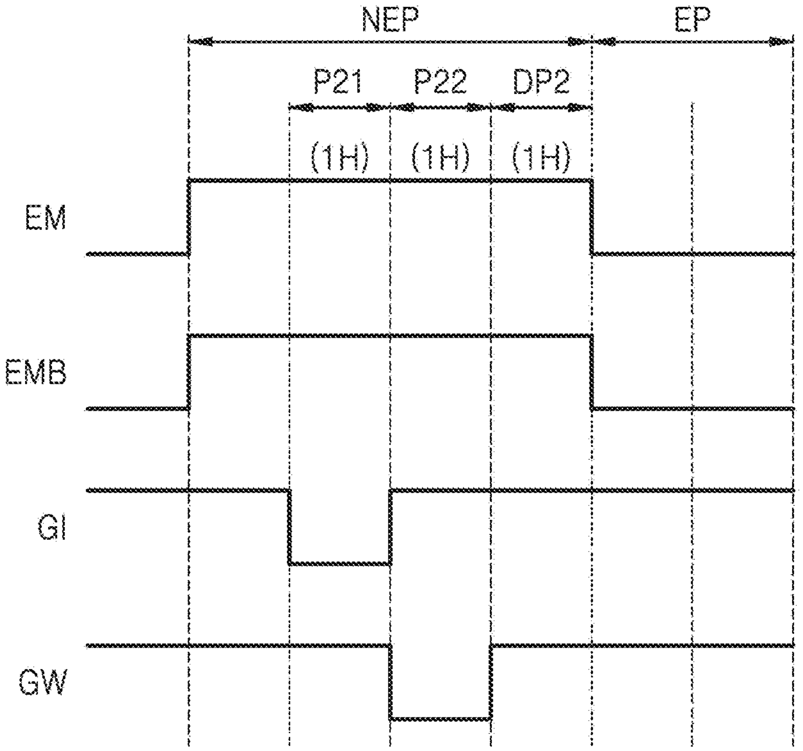
FIG. 6 is a timing diagram illustrating driving signals of a pixel circuit shown in FIG. 5, according to one or more embodiments.

FIG. 6 is a timing diagram illustrating a driving signal of the pixel circuit shown in FIG. 5, according to one or more embodiments.

The pixel PX may display an image for each frame period. One frame period may include a non-emission period NEP in which the pixel PX does not emit light and an emission period EP in which the pixel PX emits light. The non-emission period NEP may include a first period P21, a second period P22, and a delay period DP2.

The first gate signal GW, the second gate signal GI, the fourth gate signal EM, and the fifth gate signal EMB may each have a high level voltage for some periods and a low level voltage for some other periods. In one or more embodiments, the high level voltage of each of the first gate signal GW, the second gate signal GI, the fourth gate signal EM, and the fifth gate signal EMB may be a gate-off voltage that turns off a transistor, and the low level voltage of each of the first gate signal GW, the second gate signal GI, the fourth gate signal EM, and the fifth gate signal EMB may be a gate-on voltage that turns on the transistor.

The first period P21 may be an initialization period that initializes the gate of the first transistor T1. The first period P21 may be approximately one horizontal period 1H.

In the first period P21, the first gate signal GW having the gate-off voltage may be supplied to the first gate line, the second gate signal GI having the gate-on voltage may be supplied to the second gate line, the fourth gate signal EM having the gate-off voltage may be supplied to the fourth gate line, and the fifth gate signal EMB having the gate-off voltage may be supplied to the fifth gate line. The initialization voltage Vint may be supplied through the initialization voltage line. When the initialization voltage Vint is supplied, the gate of the first transistor T1 may be initialized.

The fourth transistor T4 may be turned on in response to the second gate signal GI. The initialization voltage Vint may be transferred to the gate node G, that is, the gate of the first transistor T1, through the turned-on fourth transistor T4. In the first period P21, the voltage of the gate node G may be initialized to the initialization voltage Vint.

The second period P22 may be a writing and compensation period in which the data voltage Vdata is transferred to the gate of the first transistor T1 (e.g., because during the second period P22, the first transistor T1 is diode-connected) and the threshold voltage of the first transistor T1 is compensated. The second period P22 may be approximately one horizontal period 1H.

In the second period P22, the first gate signal GW having the gate-on voltage may be supplied to the first gate line, the second gate signal GI having the gate-off voltage may be supplied to the second gate line, the fourth gate signal EM having the gate-off voltage may be supplied to the fourth gate line, and the fifth gate signal EMB having the gate-off voltage may be supplied to the fifth gate line. The data voltage Vdata corresponding to the data signal may be supplied to the data line.

The second transistor T2, the third transistor T3, and the seventh transistor T7 may be turned on by the first gate signal GW. In this case, the fourth transistor T4, the fifth transistor T5, the sixth transistor T6, and the eighth transistor T8 may be turned off by the second gate signal GI, the fourth gate signal EM, and the fifth gate signal EMB that have the gate-off voltage.

As the second transistor T2 is turned on by the first gate signal GW, the data voltage Vdata corresponding to a data signal transmitted through the data line may be supplied to the first terminal of the first transistor T1.

As the third transistor T3 is turned on by the first gate signal GW, the drain of the first transistor T1 and the gate of the first transistor T1 may be coupled, and thus, the first transistor T1 may be in a diode-connected state, and the voltage of the second terminal of the first transistor T1, that is, a drain voltage (Vd), may be the gate voltage of the first transistor T1. A voltage obtained by compensating the data voltage Vdata, which is a voltage applied to the first terminal (i.e., the source) of the first transistor T1, by the threshold voltage Vth of the first transistor T1, that is, (Vdata+Vth) (where Vdata is the voltage of the second node N2 and Vth is the threshold voltage of the first transistor T1), may be applied to the gate of the first transistor T1, and a voltage corresponding to (Vdata+Vth) may be stored in the storage capacitor Cst.

As the seventh transistor T7 is turned on by the first gate signal GW, the initialization voltage Vint supplied to the initialization voltage line connected to the second terminal of the seventh transistor T7 may be supplied to the pixel electrode of the light-emitting diode ED connected to the first terminal of the seventh transistor T7, and the light-emitting diode ED may be initialized by the initialization voltage Vint.

The delay period DP2 may be a period in which the first gate signal GW, the second gate signal GI, the fourth gate signal EM, and the fifth gate signal EMB all have the gate-off voltage. By adding the delay period DP2, in which all of the first, second, fourth, and fifth gate signals GW, GI, EM, and EMB have the gate-off voltage, after a data writing period, which is the second period P22, all transistors in the pixel circuit may be turned off, and by reducing interference from adjacent pixels PX, the data voltage Vdata corresponding to the data signal may be stabilized at a certain level. By adding the delay period DP2, the data voltage Vdata may be written more accurately to the first transistor T1, and thus, the pixel PX may emit light according to RGB colors by the data voltage Vdata with less loss in the emission period EP.

In one or more embodiments, during the non-emission period NEP, the fifth transistor T5 and the sixth transistor T6 may be turned off by the fourth gate signal EM, and the eighth transistor T8 may be turned off by the fifth gate signal EMB. When leakage current is generated by the deteriorated sixth transistor T6, the voltage $V_4$ of the fourth node N4 may be lower than the voltage $V_3$ of the third node N3. When the voltage $V_4$ of the fourth node N4 is lower than the voltage $V_3$ of the third node N3 due to leakage of the sixth transistor T6, the source voltage of the eighth transistor T8 may be lower than that when no leakage current occurs in the sixth transistor T6. Accordingly, the gate-source voltage ($V_{GS}$(T8)) of the eighth transistor T8 when the eighth transistor T8 is turned off is ($V_{GH}-V_4$) (where $V_{GH}$ is the gate high voltage of the eighth transistor T8 and $V_4$ is the source voltage of the eighth transistor T8) and is greater than the gate-source voltage ($V_{GS}$(T6)) of the sixth transistor T6 when the sixth transistor T6 is turned off, wherein the gate-source voltage ($V_{GS}$(T6)) is ($V_{GH}-V_3$) (where $V_{GH}$ is the gate high voltage of the sixth transistor T6 and $V_3$ is the source voltage of the sixth transistor T6). Thus, the eighth transistor T8 may be surely turned off and leakage current of the sixth transistor T6 may be blocked from flowing into the light-emitting diode ED. The pixel PX according to one or more embodiments includes the sixth transistor T6 and the eighth transistor T8 connected in series to the sixth transistor T6, between the light-emitting diode ED and the second terminal of the first transistor T1, and thus, turn-off efficiency may be higher than that when the sixth transistor T6 is directly connected to the light-emitting diode ED.

The emission period EP may be a period during which the light-emitting diode ED emits light. In the emission period EP, the fourth gate signal EM having the gate-on voltage may be supplied to the fourth gate line. The first gate signal GW having the gate-off voltage may be supplied to the first gate line, and the second gate signal GI having the gate-off voltage may be supplied to the second gate line. The fourth gate signal EM having the gate-on voltage may be supplied to the fourth gate line, and the fifth gate signal EMB having the gate-on voltage may be supplied to the fifth gate line.

In the emission period EP, the second transistor T2, the third transistor T3, and the seventh transistor T7 may be turned off by the first gate signal GW, the fourth transistor T4 may be turned off by the second gate signal GI, the fifth transistor T5 and the sixth transistor T6 may be turned on by the fourth gate signal EM, and the eighth transistor T8 may be turned on by the fifth gate signal EMB.

As the fifth transistor T5, the sixth transistor T6, and the eighth transistor T8 are turned on, a current path through which the driving current Id flows from the driving voltage line to the light-emitting diode ED may be formed. The first driving voltage VDD may be supplied to the first terminal of the first transistor T1 by the turned-on fifth transistor T5, the turned-on first transistor T1 may output a first driving current ($Id_1 \propto (V_{GS}(T1) - Vth)^2$) having a size corresponding to a voltage ($V_{GS}(T1) - Vth$) obtained by subtracting the threshold voltage (Vth) of the first transistor T1 from the gate-source voltage ($V_{GS}(T1)$) of the first transistor T1, and the light-emitting diode ED may emit light having a brightness corresponding to the size of the first driving current $Id_1$, which is independent of the threshold voltage (Vth) of the first transistor T1.

Figure 7:
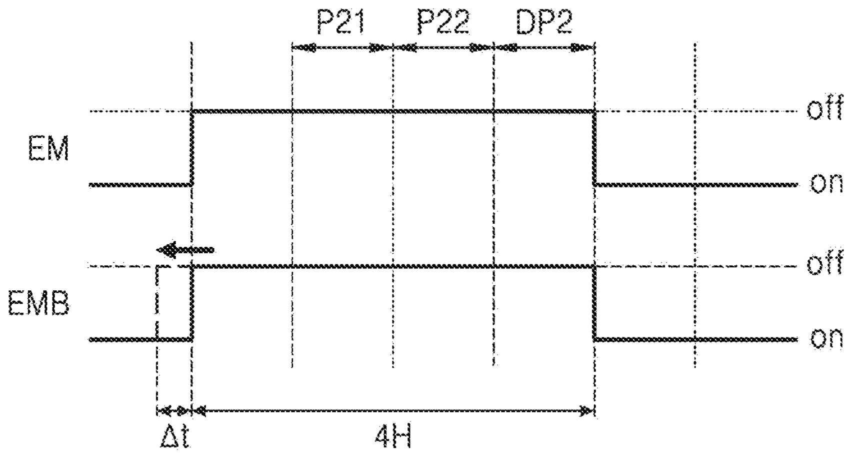
FIG. 7 is a timing diagram illustrating a method of preventing current leakage by adjusting the driving timing of an eighth transistor of a pixel circuit, according to one or more embodiments.

FIG. 7 is a diagram illustrating a method of preventing current leakage by adjusting the driving timing of the eighth transistor of the pixel circuit, according to one or more embodiments.

Referring to FIG. 7, in the non-emission period NEP, the fifth transistor T5 and the sixth transistor T6 may be turned off by the gate-off voltage of the fourth gate signal EM. Additionally, the eighth transistor T8 may be turned off by the gate-off voltage of the fifth gate signal EMB.

In one or more embodiments, the fourth gate signal EM and the fifth gate signal EMB may be gate signals transmitted along different gate lines. For example, the fourth gate signal EM may be a gate signal transmitted by the fourth gate line, and the fifth gate signal EMB may be a gate signal transmitted by the fifth gate line. The fourth gate signal EM transmitted by the fourth gate line and the fifth gate signal EMB transmitted by the fifth gate line may be supplied as a gate-on voltage and a gate-off voltage at different timings.

Referring to FIG. 7, the timing at which the fifth gate signal EMB changes from the gate-on voltage to the gate-off voltage may be ahead, by Δt, of the timing at which the fourth gate signal EM changes from the gate-on voltage to the gate-off voltage. For example, as the fifth gate signal EMB changes to the gate-off voltage by Δt before the fourth gate signal EM, while the fourth gate signal EM maintains the gate-off voltage for four horizontal periods 4H, the fifth gate signal EMB may maintain the gate-off voltage for a horizontal period of (4+Δt)H, which is longer than four horizontal periods 4H by Δt, and change to the gate-on voltage. As the fifth gate signal EMB changes to the gate-off voltage before the fourth gate signal EM, the eighth transistor T8 may be turned off before the sixth transistor T6. As the eighth transistor T8 is turned off first, the leakage current of the sixth transistor T6 may not immediately flow to the light-emitting diode ED, and the eighth transistor T8 may block the leakage current generated in the sixth transistor T6.

Figure 8A:
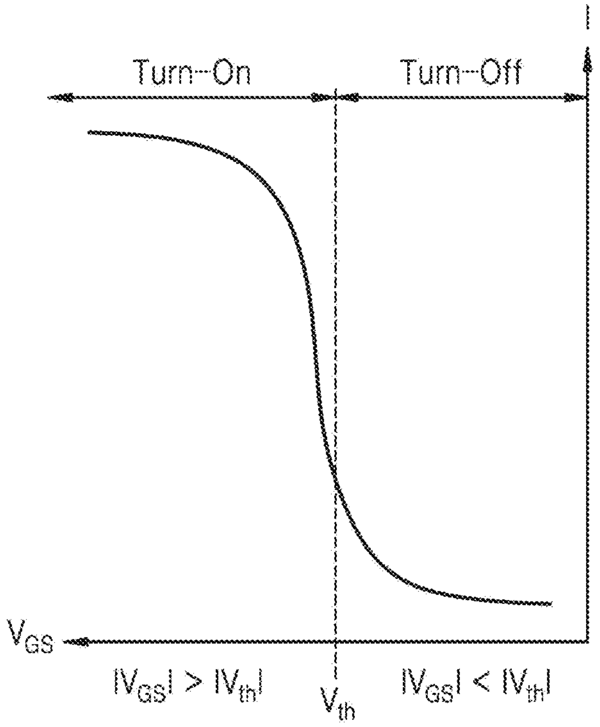
FIG. 8A is a diagram for explaining the turn-on and turn-off of a P-type transistor according to the gate voltage of the P-type transistor of the pixel circuit, according to one or more embodiments.
Figure 8B:
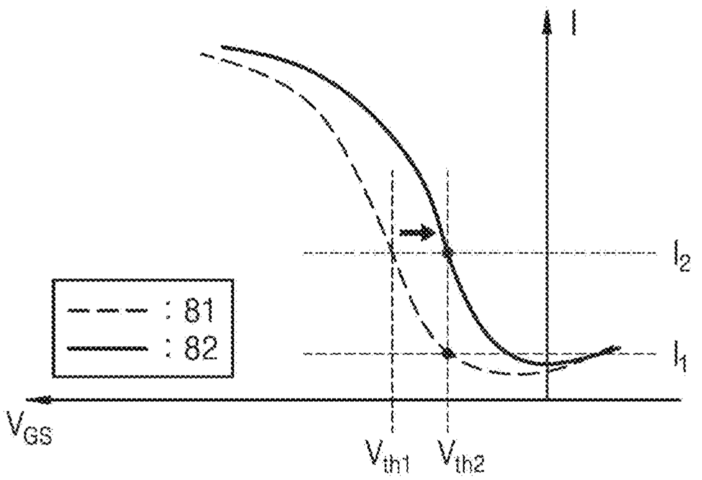
FIG. 8B is a diagram for explaining the amount of leakage current according to the threshold voltage of the P-type transistor of the pixel circuit, according to one or more embodiments.

FIG. 8A is a diagram for explaining the turn-on and turn-off of a P-type transistor according to the gate voltage of the P-type transistor, according to one or more embodiments, and FIG. 8B is a diagram for explaining the amount of leakage current according to the threshold voltage of the P-type transistor, according to one or more embodiments.

Referring to FIG. 8A, the threshold voltage Vth of the P-type transistor may be a negative voltage value. Therefore, when the magnitude (e.g., an absolute value) of the gate-source voltage $V_{GS}$ of the P-type transistor is greater than or equal to the threshold voltage Vth, the P-type transistor may be turned on, and a channel may be formed between the source and the drain of the P-type transistor and thus a current I may flow. On the other hand, when the magnitude (e.g., an absolute value) of the gate-source voltage $V_{GS}$ of the P-type transistor is less than the magnitude of the threshold voltage Vth, the current I may not flow in the P-type transistor as the P-type transistor is turned off. However, even when the P-type transistor is turned off, leakage current may flow through the P-type transistor. When the magnitude of the threshold voltage Vth of the P-type transistor decreases due to deterioration (that is, it may mean that the threshold voltage Vth increases but the absolute value of the threshold voltage Vth decreases), the amount of leakage current may increase. For example, referring to FIG. 8B, a threshold voltage Vth2 of the transistor following a graph 82 is greater than a threshold voltage Vth1 of the transistor following a graph 81, and an absolute value $|V_{th1}|$ of a threshold voltage $V_{th1}$ of the transistor following a graph 81 is greater than an absolute value $|V_{th2}|$ of a threshold voltage $V_{th2}$ of the transistor following a graph 82, that is, |Vth1|>|Vth2| because the threshold voltage Vth has a negative value. Therefore, because the threshold voltage Vth2 of the transistor following the graph 82 is greater than the threshold voltage Vth1 of the transistor following the graph 81, the amount of leaked current $I_2$ may be greater for the transistor following the graph 82 than the amount of leaked current $I_1$ for the transistor following the graph 81 ($I_2 > I_1$). Therefore, the higher the gate-source voltage $V_{GS}$ of the P-type transistor with a negative voltage value, the lower the magnitude (e.g., an absolute value) of the gate-source voltage $V_{GS}$, and thus, substantially the same effect as increasing the magnitude (e.g., an absolute value) of the threshold voltage may be achieved, and the turn-off efficiency may be increased and the amount of leaked current may be reduced.

In one or more embodiments, in order to prevent loss of the data voltage Vdata transmitted to the first transistor T1, which is a driving transistor, the loss being caused by the leakage current of a transistor, the pixel PX may include a transistor (e.g., the eighth transistor T8 in FIG. 2) connected in series with the second transistor T2 between the data line and the first terminal of the first transistor T1. When the second transistor T2 is turned off, the voltage of the second terminal of the second transistor T2 is lowered due to leakage current, and therefore, the value of the gate-source voltage ($V_{GS}(T8)$) of the eighth transistor T8 connected to the second terminal of the second transistor T2 increases. Accordingly, the turn-off efficiency of the eighth transistor T8 may be increased and the turn-off of the eighth transistor T8 may be reliably guaranteed. Accordingly, a decrease in the first terminal voltage of the first transistor T1 due to the leakage current of the second transistor T2 may be prevented.

In one or more embodiments, in order to prevent micro-emission of light from the light-emitting diode ED due to leakage current transmitted to the light-emitting diode ED in the non-emission period NEP, the pixel PX may include a transistor (the eighth transistor T8 in FIG. 5) connected in series with the sixth transistor T6 between the second terminal of the first transistor T1 and the light-emitting diode ED. When the sixth transistor T6 is turned off, the voltage of the second terminal of the sixth transistor T6 is lowered due to leakage current, and therefore, the value of the gate-source voltage ($V_{GS}(T8)$) of the eighth transistor T8 (when turned off) connected to the second terminal of the sixth transistor T6 increases. Accordingly, the turn-off efficiency of the eighth transistor T8 may be increased and the turn-off of the eighth transistor T8 may be reliably guaranteed. Accordingly, the leakage current of the sixth transistor T6 may be prevented from flowing into the pixel electrode of the light-emitting diode ED.

The operations of the method or algorithm described in connection with embodiments of the present disclosure may be implemented directly in hardware, implemented as a software module executed by hardware, or a combination thereof. The software module may be random access memory (RAM), read only memory (ROM), erasable programmable ROM (EPROM), electrically erasable programmable ROM (EEPROM), flash memory, hard disk, removable disk, CD-ROM, or may reside on any type of computer-readable recording medium well known in the art to which the present disclosure pertains.

A display apparatus according to some embodiments of the disclosure may be an apparatus displaying a video or a static image, and may visually provide information to a user. The display apparatus be used as a display screen of various electronic apparatus, such as a television, a notebook computer, a monitor, a broadcasting panel, and an Internet of things (IOT) device, as well as portable electronic devices, such as a mobile phone, a smart phone, a tablet personal computer (PC), a mobile communication terminal, an electronic notebook, an electronic book, a portable multimedia player (PMP), a navigation device, and an ultra-mobile PC (UMPC). Also, the display apparatus according to an embodiment may be used in wearable electronic apparatus, such as a smart watch, a watch phone, a glasses-type display, and a head-mounted display (HMD). Also, the display apparatus according to an embodiment may be used as an electronic apparatus, such as a center information display (CID) on a dashboard of a vehicle or a center fascia or a dashboard of the vehicle, a room mirror display substituting a side-view mirror of a vehicle, or a display disposed on a rear surface of a front seat, as an entertainment device for a backseat of a vehicle. Also, the display apparatus may be a flexible apparatus.

According to the means for solving the above-described objective of the present disclosure, it is possible to provide a display apparatus having improved image quality by preventing a data voltage written from a data voltage line from being lowered due to leakage current of a switching transistor.

The effects, aspects, and features of embodiments of the present disclosure are not limited to the effects, aspects, and features, described above, and other effects, aspects, and features, not mentioned herein may be clearly understood by those skilled in the art from the description above.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A pixel comprising:
- a first transistor configured to output a driving current corresponding to a magnitude of a data voltage;
- a second transistor connected to a data line;
- a third transistor connected between a second terminal of the first transistor and a gate of the first transistor;
- a fourth transistor connected between a first terminal of the first transistor and a driving voltage line;
- a fifth transistor connected to the second terminal of the first transistor;
- a sixth transistor connected between the first terminal of the first transistor and the second transistor;
- a light-emitting diode connected to the fifth transistor; and
- a storage capacitor connected between the gate of the first transistor and the driving voltage line, wherein the second transistor and the sixth transistor are simultaneously turned on and simultaneously turned off.

2. The pixel of claim 1, further comprising a seventh transistor connected between the third transistor and an initialization voltage line.

3. The pixel of claim 2, further comprising an eighth transistor connected between the fifth transistor and the initialization voltage line.

4. The pixel of claim 3, wherein the pixel operates in a non-emission period and an emission period, during a frame period, wherein the non-emission period comprises:
- a first period in which the seventh transistor is turned on, the second transistor, the third transistor, the fourth transistor, the fifth transistor, the sixth transistor, and the eighth transistor are turned off, and an initialization voltage is applied to the gate of the first transistor from the initialization voltage line; and
- a second period in which the second transistor, the third transistor, the sixth transistor, and the eighth transistor are turned on, the fourth transistor, the fifth transistor, and the seventh transistor are turned off, a data signal is applied to the gate of the first transistor from the data line, and the initialization voltage is applied to a first terminal of the light-emitting diode from the initialization voltage line.

5. The pixel of claim 4, wherein, in the second period, a data voltage corresponding to the data signal applied to the first transistor and a threshold voltage of the first transistor are stored in the storage capacitor.

6. The pixel of claim 4, wherein the fourth transistor and the fifth transistor are turned on during the emission period.

7. The pixel of claim 6, wherein the non-emission period further comprises, between the second period and the emission period, a delay period in which the second transistor, the third transistor, the fourth transistor, the fifth transistor, the sixth transistor, the seventh transistor, and the eighth transistor are turned off.

8. The pixel of claim 7, wherein, in the second period, the second transistor and the third transistor are controlled by a first gate signal, the eighth transistor is controlled by a second gate signal, and the sixth transistor is controlled by a third gate signal.

9. The pixel of claim 8, wherein a timing at which the third gate signal transitions from a gate-on voltage to a gate-off voltage and the sixth transistor is turned off is ahead of a timing at which the first gate signal transitions from the gate-on voltage to the gate-off voltage and the second transistor is turned off.

10. The pixel of claim 7, wherein, during the delay period, a gate-source voltage of the turned-off sixth transistor is greater than a gate-source voltage of the turned-off second transistor.

11. A pixel comprising:
- a first transistor configured to output a driving current corresponding to a magnitude of a data voltage;
- a second transistor connected between a first terminal of the first transistor and a data line;
- a third transistor connected between a second terminal of the first transistor and a gate of the first transistor;
- a fourth transistor connected between the first terminal of the first transistor and a driving voltage line;
- a fifth transistor connected to the second terminal of the first transistor;
- a sixth transistor connected between the fifth transistor and a light-emitting diode; and a storage capacitor connected between the gate of the first transistor and the driving voltage line, wherein the fourth transistor, the fifth transistor, and the sixth transistor are simultaneously turned on and simultaneously turned off, and wherein the sixth transistor comprises a first terminal connected to the fifth transistor and a second terminal connected to an anode of the light-emitting diode.

12. The pixel of claim 11, further comprising a seventh transistor connected between the third transistor and an initialization voltage line.

13. The pixel of claim 12, further comprising an eighth transistor connected between the sixth transistor and the initialization voltage line.

14. The pixel of claim 13, wherein the pixel operates in a non-emission period and an emission period, during a frame period, wherein the non-emission period comprises:

a first period in which the seventh transistor is turned on, the second transistor, the third transistor, the fourth transistor, the fifth transistor, the sixth transistor, and the eighth transistor are turned off, and an initialization voltage is applied to the gate of the first transistor from the initialization voltage line; and a second period in which the second transistor, the third transistor, and the eighth transistor are turned on, the fourth transistor, the fifth transistor, the sixth transistor, and the seventh transistor are turned off, a data signal is applied to the gate of the first transistor from the data line, and the initialization voltage is applied to a first terminal of the light-emitting diode from the initialization voltage line.

15. The pixel of claim 14, wherein the fourth transistor, the fifth transistor, and the sixth transistor are turned on in the emission period.

16. The pixel of claim 15, wherein the non-emission period further comprises, between the second period and the emission period, a delay period in which the second transistor, the third transistor, the fourth transistor, the fifth transistor, the sixth transistor, the seventh transistor, and the eighth transistor are turned off.

17. The pixel of claim 15, wherein, in the second period, the second transistor and the third transistor are controlled by a fourth gate signal, and the eighth transistor is controlled by a fifth gate signal.

18. The pixel of claim 15, wherein, in the emission period, the fourth transistor and the fifth transistor are controlled by a sixth gate signal, and the sixth transistor is controlled by a seventh gate signal.

19. The pixel of claim 18, wherein a timing at which the seventh gate signal transitions from a gate-on voltage to a gate-off voltage and the sixth transistor is turned off is ahead of a timing at which the sixth gate signal transitions from the gate-on voltage to the gate-off voltage and the fifth transistor is turned off.

20. The pixel of claim 14, wherein, during the non-emission period, the fifth transistor and the sixth transistor are turned off, and a gate-source voltage of the turned-off sixth transistor is greater than a gate-source voltage of the turned-off fifth transistor.

* * * * *